Dec. 2, 1924. 1,518,034
J. A. WHITING
INTERNAL COMBUSTION MOTOR PROPELLED RAILWAY CAR
Original Filed March 18, 1922 5 Sheets-Sheet 1
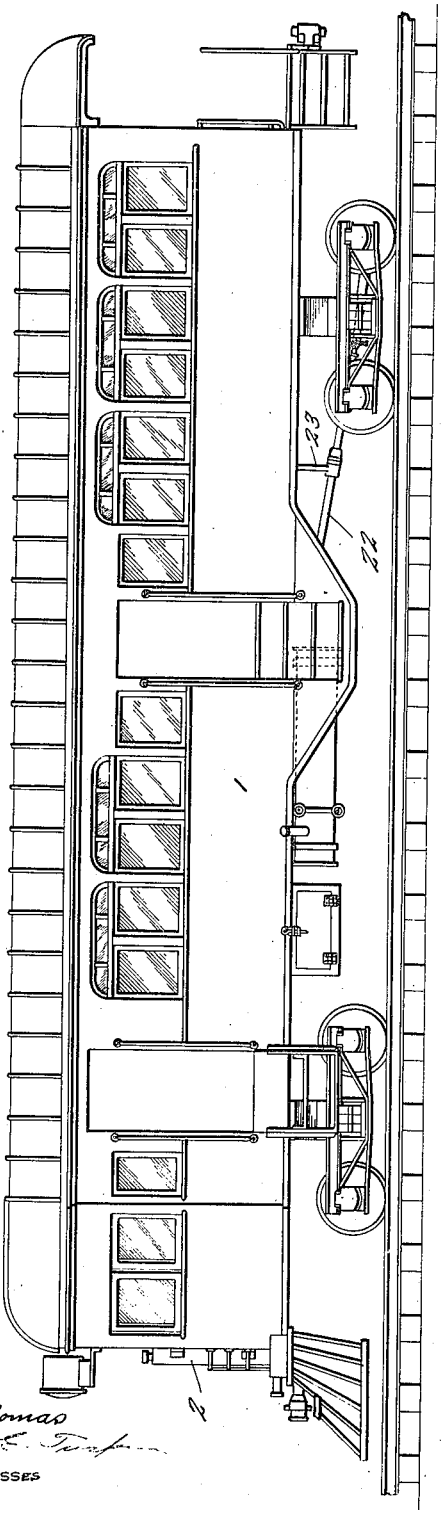
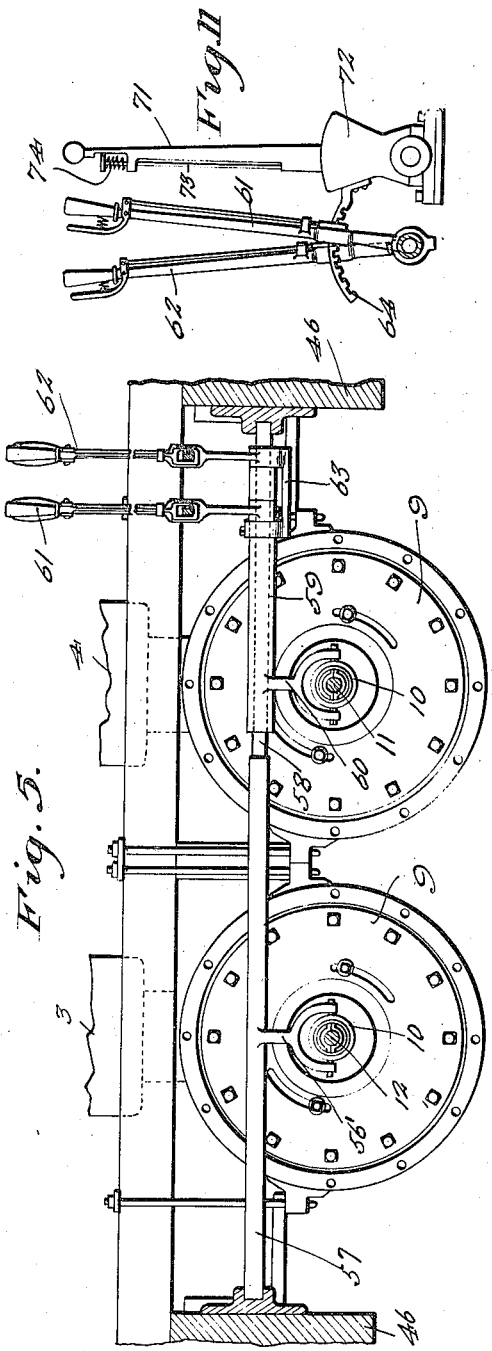
John A. Whiting INVENTOR
BY Victor J. Evans ATTORNEY
WITNESSES Dec. 2, 1924.
J. A. WHITING
1,518,034
INTERNAL COMBUSTION MOTOR PROPELLED RAILWAY CAR
Original Filed March 18, 1922   5 Sheets-Sheet 2
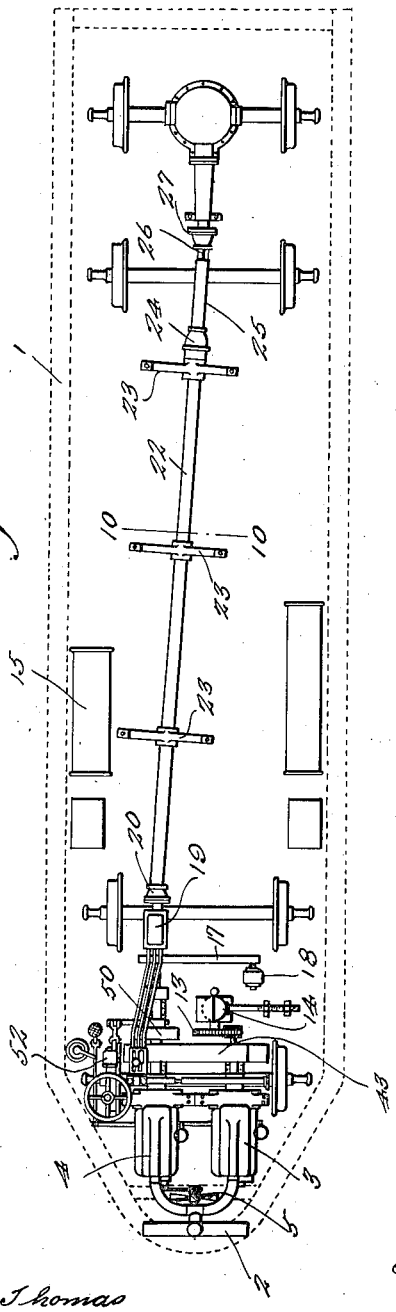

Dec. 2, 1924. 1,518,034
J. A. WHITING
INTERNAL COMBUSTION MOTOR PROPELLED RAILWAY CAR
Original Filed March 18, 1922   5 Sheets-Sheet 3

INVENTOR
John A. Whiting
BY Victor J. Evans
ATTORNEY

WITNESSES

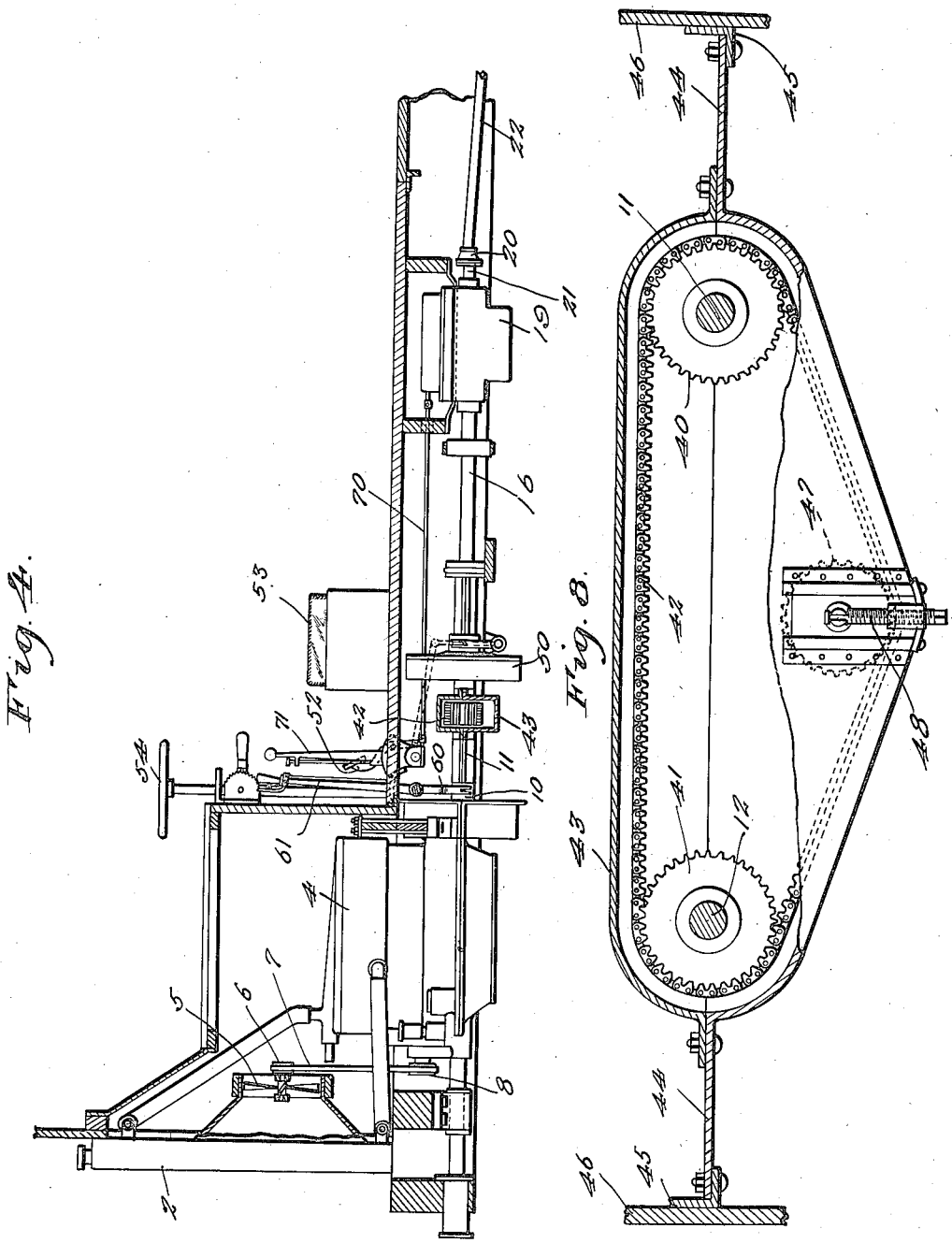

Dec. 2, 1924.  1,518,034
J. A. WHITING
INTERNAL COMBUSTION MOTOR PROPELLED RAILWAY CAR
Original Filed March 18, 1922    5 Sheets-Sheet 5
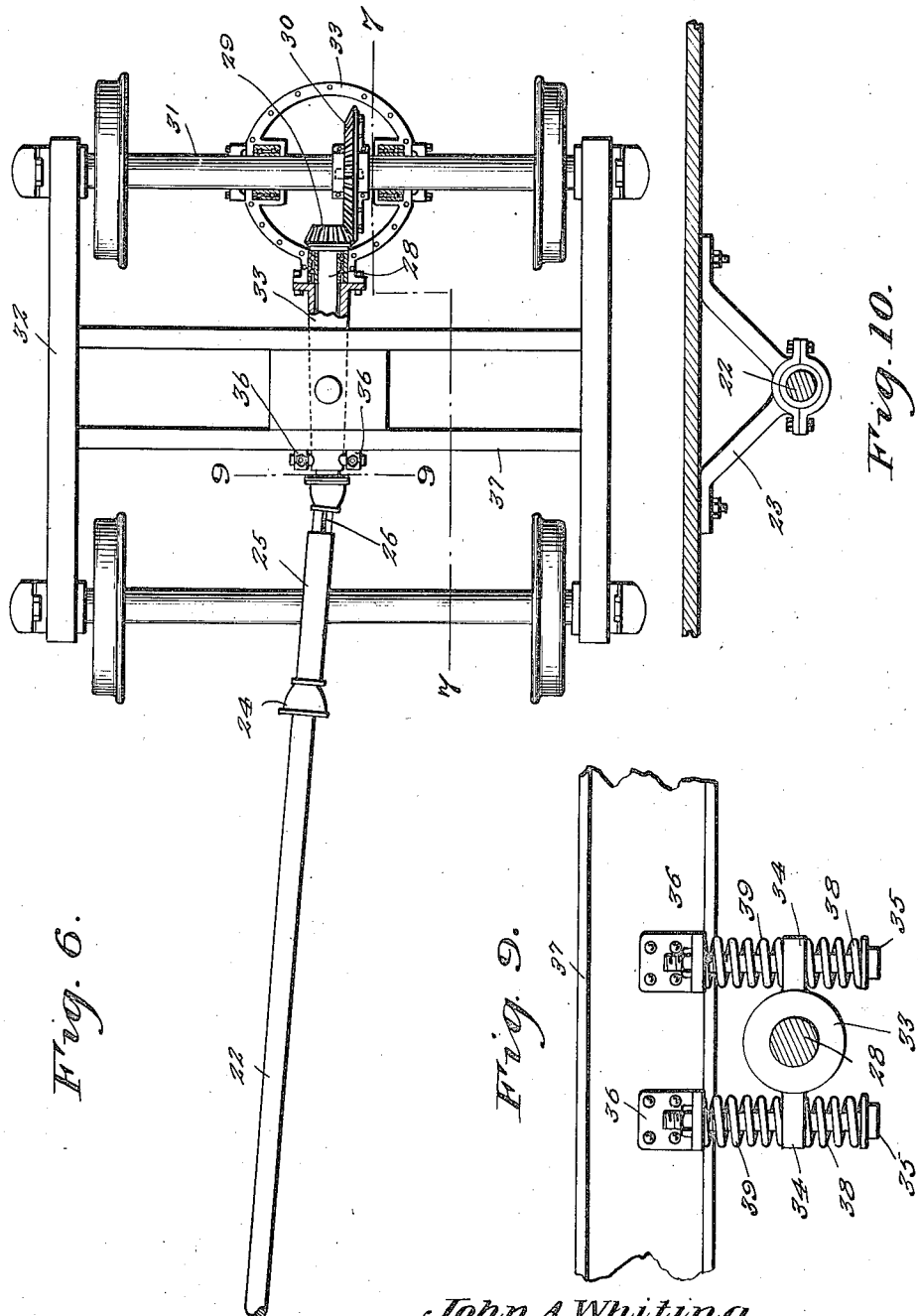

Patented Dec. 2, 1924.

1,518,034

UNITED STATES PATENT OFFICE.

JOHN A. WHITING, OF WAYCROSS, GEORGIA.

INTERNAL-COMBUSTION-MOTOR-PROPELLED RAILWAY CAR.

Application filed March 18, 1922, Serial No. 544,866. Renewed September 23, 1924.

*To all whom it may concern:*

Be it known that I, JOHN A. WHITING, a citizen of the United States, residing at Waycross, in the county of Ware and State of Georgia, have invented new and useful Improvements in Internal-Combustion-Motor-Propelled Railway Cars, of which the following is a specification.

The chief object of my said invention is the provision of a practically advantageous railway car characterized by twin internal combustion motors, and reliable means under the control of the motorman whereby the car may be driven by both motors in concert or by either motor, the changes being susceptible of being quickly and easily effected, and the said characteristic being important inasmuch as it averts putting the car out of commission or delaying the same in the event of either motor getting out of order.

Another object of the invention is the provision of a car of the kind described all of the units comprised in the propelling means of which are readily procurable at various points so that in the event of breakage any one of the said units may be readily replaced with a fresh unit.

To the attainment of the foregoing, the invention consists in the improvement as hereinafter described and definitely claimed.

In the accompanying drawings, forming part of this specification:—

Figure 1 is a side elevation illustrating a railway car in which my improvement has been reduced to actual practice and successfully operated.

Figure 2 is a diagrammatic plan view illustrating the relative arrangement of the various units entering into my novel propelling means.

Figure 4 is a longitudinal vertical detail section taken on the line 4—4 of Figure 3.

Figure 5 is a transverse section taken in the plane indicated by the line 5—5 of Figure 3.

Figure 6 is a detail plan view, partly in section, illustrating the rear truck of the car and the parts adjacent thereto.

Figure 7 is a vertical longitudinal section on the line 7—7 of Figure 6.

Figure 8 is a transverse section taken in the plane indicated by the line 8—8 of Figure 3.

Figure 9 is a detail section taken on the line 9—9 of Figure 6.

Figure 10 is a fragmentary transverse section on the line 10—10 of Figure 2.

Figure 11 is a detail view illustrative of hand levers hereinafter explicitly alluded to.

Figure 3:
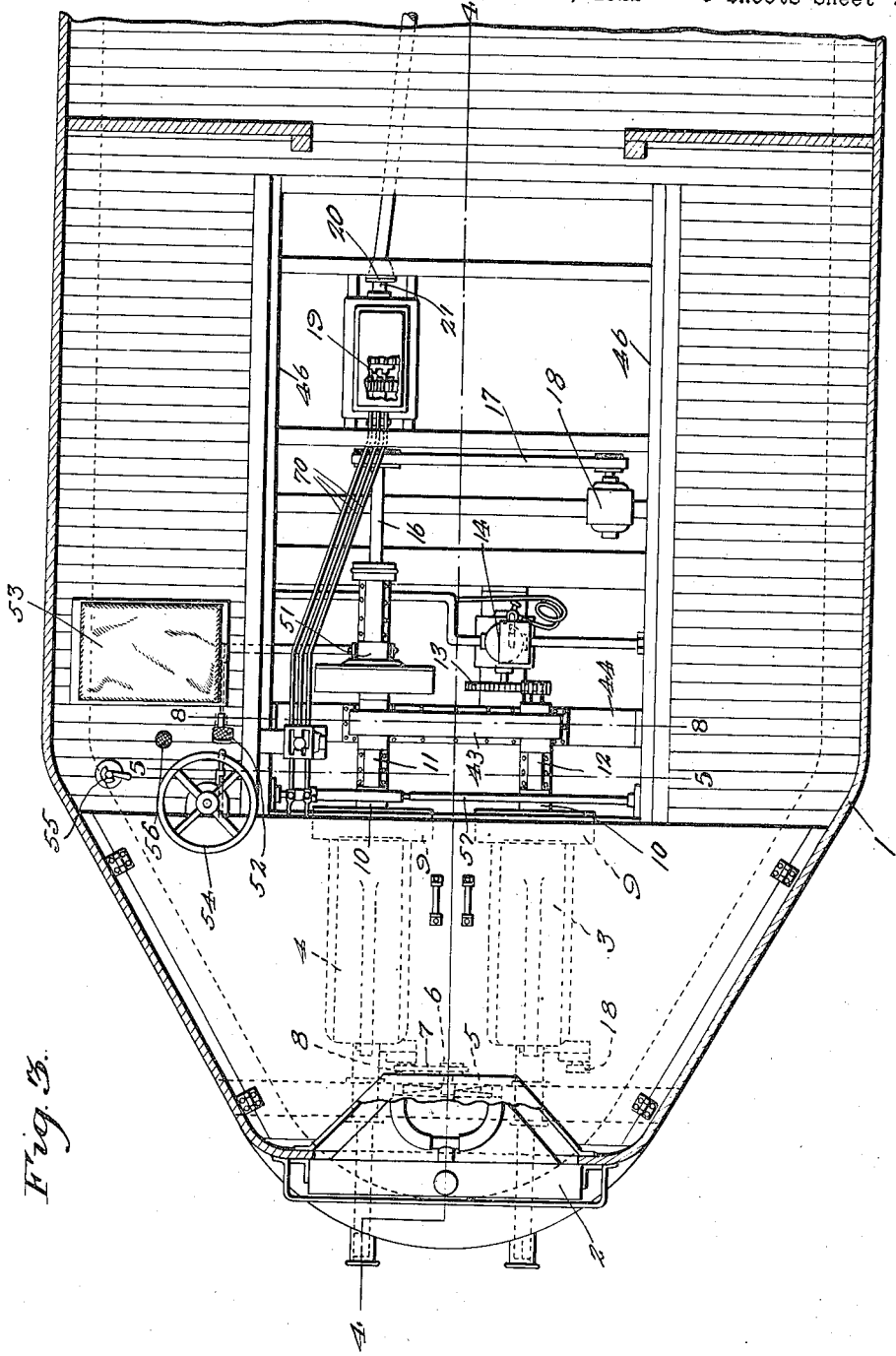
Figure 3 is an enlarged detail horizontal section of the forward end portion of the said car.

It will be understood that Figures 3, 4, 5, 6, 7, 8, 9, 10 and 11 are on an enlarged scale.

Similar numerals of reference designate corresponding parts in all of the views of the drawings.

The car body 1 is provided at its forward end with a radiator 2 in connection with the water containers of twin internal combustion motors 3 and 4 each of which motors 3 and 4 is per se of the ordinary well known construction used in heavy trucks. Located in rear of the radiator 2 is a cooling fan 5 on the shaft of which is a pulley 6, connected by a band 7 with a pulley 8 on the drive shaft of one of the motors 3 or 4. In this connection it will be understood that when either one of the said motors is put out of commission the band 7 will be transferred by the motorman or by any other attendant from the pulley 8 of the idle motor to the corresponding pulley of the active motor, provided of course such transfer is necessary. When the band 7 happens to be on the pulley 8 of the motor that is retained in commission no transfer of course will be necessary.

Carried at the rear of each of the motors 3 and 4 and operable thereby is a clutch member 9, and complementary to each clutch member 9 is a clutch member 10. One of the clutch members 10 is mounted to turn with and be adjusted on a shaft 11, and the other clutch member 10 is mounted to be adjusted on and turn with a shaft 12, the said shaft 12 being connected by gearing 13, Figures 2 and 3 with an air compressing pump 14 for charging a compressed air reservoir 15, designed for use in the fluid pressure brake system of the car which is not of my invention and may therefore be of any approved character. Alined with the shaft 11 and arranged in rear thereof is a longitudinal shaft 16, connected by a band 17, Figure 3, with an electric generator 18 which per se is preferably of the ordinary well known construction. The air pump 14 is also by preference of the ordinary well known construction. The shaft 16 is always used for the propulsion of the car, the said shaft 16 being connected with a transmission 19 which per se is of the type ordinarily employed in heavy trucks driven by internal combustion motors and need not therefore be described in detail. Connected by an universal joint 20 to the rear end of a transmission shaft 21 is a comparatively long shaft 22, carried in hangers 23 on the car body 1, Figures 2 and 10, and connected at its rear end through an universal joint 24 with a sleeve 25, Figures 2 and 6. Telescopically arranged in the sleeve 25 and adapted to be turned thereby is a shaft section 26, of angular form in cross section, which is capable of endwise movement in said sleeve 25. The rear end of the shaft section 26 is connected by an universal joint 27 with a shaft section 28. This shaft section 28 is connected by gears 29 and 30 with the rear axle 31 carried by the rear truck 32 of the car as best shown in Figure 6. An appropriate housing 33 encloses the gears 29 and 30 and is provided with a forwardly and upwardly extending sleeve portion 33, Figures 6 and 7, said sleeve portion carrying the before mentioned shaft 28. On the forward portion of the sleeve portion 33 of the housing are lateral apertured lugs 34, Figures 6, 7 and 9. The said lugs 34 loosely receive headed bolts 35 that are connected to and depend from lugs 36 on a beam 37 of the truck. On the said bolts 35 and interposed between the heads thereof and the undersides of the lugs 34 are cushioning springs 38, and also surrounding the bolts 35 and interposed between the lugs 36 are cushioning springs 39. Manifestly the said springs 38 and 39 relatively arranged as shown and described, serve to cushion the housing sleeve 33 and the shaft section 28 incident to the starting of the car, and also serve to cushion the said parts during the operation of the car. The slidable capacity of the shaft section 26 in the sleeve 25 lends flexibility to the driving connection as a whole and lessens the imposition of strain on any element thereof.

Appropriately fixed on the shafts 11 and 12, Figure 8 are sprocket gears 40 and 41 and mounted on and connecting the said sprocket gears 40 and 41 is a sprocket belt 42 preferably of the well known silent type illustrated. The said gears 40 and 41 and the belt 42 are enclosed in a transverse housing 43, Figures 2, 3, 4, and 8, the said housing 43 being connected by extensions 44, to brackets 45 on longitudinal beams 46 of the car body. In the housing 43 and engaged with the belt 42 is an idler sprocket gear 47, adjustably connected at 48 to the housing 43 and adapted to be moved when occasion demands with a view to properly tensioning the belt 42. Manifestly in virtue of the arrangement just described the gears and the sprocket belt 42 in engagement with the gears may be made to run in oil when the same is deemed expedient, and in this connection it will be understood that the belt 42 is operated when either one of the motors is operated together with its respective shaft 11 or 12. This provision assures actuation of the air pump 14 when either shaft 11 or 12 is rotated, and it also assures rotation of the shaft 16 when the said shaft 16 is clutched to the shaft 11 irrespective of whether the shaft 11 is driven directly from the motor 4 or is driven from the motor 3 through the medium of the shaft 12. The electric generator 18 as will be readily understood from Figure 3 is always actuated when the shaft 16 is rotated.

Intermediate of the shaft 11 and the shaft 16 is a clutch 50 of the type generally employed in heavy motor trucks between the engine shaft and the shaft extending to the transmission. The adjustable member 51 of the said clutch 50 is connected in the usual manner and as best shown in Figures 2, 3, and 4 with a pedal lever 52, arranged in convenient proximity to the motorman's seat 53. I would also have it understood at this point that the said lever 52 is intended to be operated by the motorman in the same manner that the corresponding lever of a motor truck is operated so that at any time the motorman will be enabled to establish and interrupt the connection between the shaft 16, on the one hand, and the motor or motors, on the other.

By particular reference to Figures 2 and 3 it will be noted that the car is equipped with a hand brake wheel 54 and an air brake lever 55. These elements are not of my invention nor is the accelerator pedal 56 connected with the internal combustion motors in the ordinary well known manner.

As best shown in Figure 5, the adjustable member 10 of the left hand motor 3 is connected with an arm 56 on a transverse rock shaft 57, the said shaft 57 being reduced as designated by 58, and a sleeve 59 being loosely mounted on the said reduced portion 58, the said sleeve 59 having an arm 60 connected with the adjustable member of the right hand clutch member 10. Fixed to the reduced portion 58 of the shaft 57 is a left hand lever 61, Figures 5 and 11, and fixed to the sleeve 59 and also fixed to a right hand lever 62 is a yoke 63. From this it follows that the shaft 57 can be turned about its axis by the lever 61, and that the sleeve 59 can be independently turned about its axis through the arm of the lever 62 and the yoke 63. Each of the said levers 61 and 62 is provided with a detent for cooperation with a respective fixed rack 64 so that either lever may be adjustably fixed independently of the other lever in the positions desired.

The transmission 19 illustrated and described as of conventional type is adapted for four speeds forwardly and one speed in reverse, and connected with parts of the said transmission and extending forwardly therefrom are three rods 70 as best shown in Figure 3.

At 71 in Figures 2, 3, 4 and 11 is a hand lever fulcrumed or mounted at an intermediate point of its length so as to be capable of being swung forwardly and rearwardly and also transversely of the car. The rods 70 are associated with the said lever 71 in the ordinary well known manner as is also a casing stand 72 in the top wall of which is an opening of the configuration shown in Figure 3. The said lever 71 is also associated with a rod 73 yieldingly held against downward movement by a spring 74. This combination affords the well known control which per se is not of my invention and through the medium of which four speeds forward may be attained by manipulation of the lever 71 while by depressing the rod 73 and then shifting the lever 71 to proper position the car may be reversed.

It will be apparent from the foregoing that in virtue of my improvement the motorman of the car is enabled to handle the same with quite as much facility as an ordinary automobile truck is handled, and it will also be apparent that the car may be propelled either by the two motors in concert or by either one of the motors in which latter event the idle motor constitutes no drag whatever on the motor that is working. This will be appreciated as an important advantage when it is stated that the car is designed more especially for passenger carrying purposes and that therefore it would not be feasible to delay the car for the making of repairs to either motor.

It will further be apparant from the foregoing that all of the parts entering into my improvement are as readily procurable as the corresponding automobile parts, and therefore in case of breakage the car need be out of commission but a very short time.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters Patent, is:—

1. The combination of a railway car having a body and drive wheels, twin internal combustion motors carried by said body, and a driving-connection including motorman controlled means whereby the motors in concert or either motor may be utilized to effect the propulsion of the car, the latter without dragging the idle motor; the said driving connection also including means whereby the connection is enabled to accommodate itself to movements of the body and the drive wheels relative to each other, and the last-named means comprising a shaft section, gearing connecting said section with the drive wheels, a truck, a vertically swinging housing containing said gearing and shaft section, telescopic shaft sections, an universal joint between one of said sections and the section in the housing, and a double acting cushioning connection between the forward portion of the housing and the truck.

2. The combination of a railway car having a body and drive wheels, twin internal combustion motors carried by said body, and a driving-connection including motorman controlled means whereby the motors in concert or either motor may be utilized to effect the propulsion of the car, the latter without dragging the idle motor; the said driving-connection also including means whereby the connection is enabled to accommodate itself to movements of the body and the drive wheels relative to each other, and the last-named means comprising a shaft section, gearing connecting said section with the drive wheels, a truck, a vertically swinging housing containing said gearing and shaft section, telescopic shaft sections, an universal joint between one of said sections and the section in the housing, and a cushioning connection between the forward portion of the housing and the truck, and made up of apertured lugs on the housing, apertured lugs on the truck, bolts extending through said lugs, lower springs between abutments on the bolts and the housing lugs, and upper springs between the housing lugs and the truck lugs.

In testimony whereof I affix my signature.

JOHN A. WHITING.